US008266682B2

(12) United States Patent  
Lee

(10) Patent No.: US 8,266,682 B2  
(45) Date of Patent: Sep. 11, 2012

(54) SYSTEM AND METHODS FOR WEAK AUTHENTICATION DATA REINFORCEMENT

(75) Inventor: Mark C. Lee, Poway, CA (US)

(73) Assignee: eBay Inc., San Jose, CA (US)

( * ) Notice: Subject to any disclaimer, the term of this patent is extended or adjusted under 35 U.S.C. 154(b) by 811 days.

(21) Appl. No.: 12/103,539

(22) Filed: Apr. 15, 2008

(65) Prior Publication Data

US 2009/0055910 A1    Feb. 26, 2009

Related U.S. Application Data

(60) Provisional application No. 60/956,854, filed on Aug. 20, 2007.

(51) Int. Cl.  
*G06F 21/20* (2006.01)  
*H04L 1/00* (2006.01)  
(52) U.S. Cl. .......... 726/7; 726/2; 726/4; 726/17; 726/21  
(58) Field of Classification Search ................. 726/7  
See application file for complete search history.

(56) References Cited

U.S. PATENT DOCUMENTS

| 6,195,698 B1 * | 2/2001 | Lillibridge et al. .......... 709/225 |
| 6,651,168 B1 * | 11/2003 | Kao et al. ...................... 713/185 |
| 6,687,823 B1 * | 2/2004 | Al-Salqan et al. ............ 713/167 |
| 7,581,245 B2 * | 8/2009 | Rojewski ........................... 726/6 |

OTHER PUBLICATIONS

Dailey, M., and Namprempre, C., "A Text-Graphics Character CAPTCHA for Password Authentication," TENCON 2004 Conference Proceedings, pp. B045-B048, 2004.*  
Furnell, S., "An assessment of website password practices," Computers and Security, vol. 26, issues 7-8, Dec. 2007.*  
Spafford, E. H., "OPUS: Preventing Weak Password Choices," Purdue Technical Report CSD-TR 92-028, Jun. 1991.*  
Rob, Peter and Carlos, Coronel, Database Systems: Design, Implementation, and Management, Seventh Edition, Thomson Course Technology, 2007.*

* cited by examiner

*Primary Examiner* — Carl Colin  
*Assistant Examiner* — John Elmore  
(74) *Attorney, Agent, or Firm* — Schwegman Lundberg & Woessner, P.A.

(57) ABSTRACT

This document discusses, among other things, a system and methods for weak authentication data reinforcement. In an example embodiment, authentication data is received in a request to authenticate a user. In response to authentication being detected to be weak authentication data, it may be determined whether the request to authenticate is associated with a human user. An example embodiment may include initiating an authentication process based on determining that the request to authenticate is associated with the human use.

26 Claims, 12 Drawing Sheets

SYSTEM AND METHODS FOR WEAK AUTHENTICATION DATA REINFORCEMENT

CLAIM OF PRIORITY

This application claims the priority benefit of U.S. Provisional Application No. 60/956,854, filed Aug. 20, 2007, which is incorporated herein by reference in its entirety.

TECHNICAL FIELD

This patent document pertains generally to information security, and more particularly, but not by way of limitation, to weak authentication data reinforcement.

BACKGROUND

A computer system may require that a user is authenticated or verified before the user is granted access to its content. One way to authenticate or verify a user is by requiring that the user enter a username and password combination known by the computer and the user.

BRIEF DESCRIPTION OF THE DRAWINGS

In the drawings like numerals describe substantially similar components throughout the several views. Like numerals having different letter suffixes represent different instances of substantially similar components. The drawings illustrate generally, by way of example, but not by way of limitation, various embodiments discussed in the present document.

DETAILED DESCRIPTION

Figure 1:
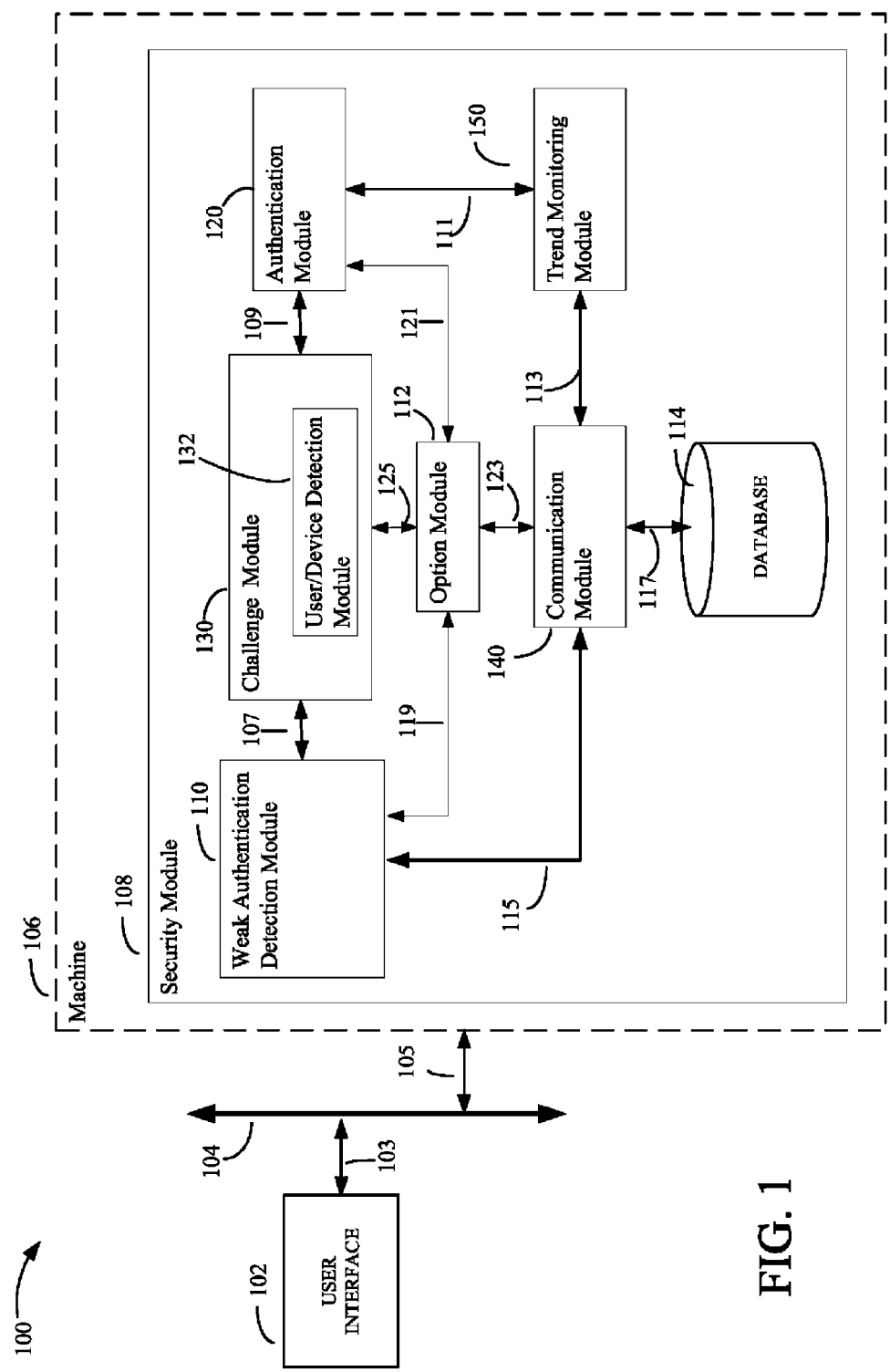
FIG. 1 is a block diagram illustrating a communication system, in accordance with an example embodiment.

In attacks on a network system, malicious code may obtain a user password by trying different username/password combinations until the malicious code successfully identifies a username and corresponding password (e.g., a substring match) that allow access to the network system. A weak password may be, for example, a password that is a subset of the username. Malicious code may limit a brute force attack to weak passwords. Once password protection has been breached, the fraudster can fraudulently sell, buy or spam users to lead users away from pages of the system web site.

An example embodiment includes a technology used to prevent a software application from fraudulently obtaining a username and password (e.g., through a brute force attack) to be used to access a machine belonging to a network system. The example embodiment includes a network system such as a commerce, publication or financial system that includes an interface connecting users over the network. The network system receives authentication requests from users to access one or more of its machines. In some example embodiments, the authentication requests include a username and password.

The example technology includes a weak password detection module with access to one or more tables in a system database. An example weak password detection module accesses one or more of the tables to detect that a submitted password is a weak password. Whether a password is weak may be defined by a system administrator. There are various factors to be considered when defining the attributes that make a password weak. In some embodiments, a password is weak if the password is a substring of the username. Passwords known to be weak (e.g., known by system administrators) may populate the tables. Alternatively or additionally, weak passwords may be derived in real time by the weak password detection module.

The example technology includes a user/device detection module that also accesses a table in order to determine whether the source of the password (e.g., the user of a device that submitted the password) has previously been recognized as being human. An Internet Protocol (IP) address or device fingerprint (e.g., one or more attributes of a device) may be associated with a network device that is considered to be safe. Some example user/device detection modules may reference a cookie or cookies on the device of the user to determine whether an IP address or fingerprint associated with the submitted username and password corresponds to a safe user device.

In an example embodiment, if the user/device detection module determines that the user has not previously been recognized as being human, a challenge module in the example embodiment initiates a challenge-response test (e.g., a Completely Automated Public Turing test to tell Computers and Humans Apart (CAPTCHA) to determine whether the user of the device is currently recognized as being human.

If the user/device detection module determines that the user has previously been recognized as being human or the challenge module determines that the user is currently recognized as being human, an authentication module in an example embodiment may enforce a user authentication policy. Conversely, if the user is not recognized as being human, the authentication module is to stop the initiation of the authentication process.

Some example embodiments may further include an option module to provide an authenticated user an option, prior to the authentication module granting access to the system, to replace their weak password with a different password that is not weak. Example embodiments may also include an option module to generate an electronic communication or provide an electronic link giving the recipient the option to change passwords.

A trend monitoring module may be employed within an example network system to count or monitor the number of CAPTCHA tests issued to users, the number of tests solved and the number of successful authentications. The trend monitoring module may measure an impact on a flow of transactions in the example commerce system based on the total number of CAPTCHAs issued, the number solved and the number of successful transactions.

This overview is intended to provide an overview of the subject matter of the present patent application. It is not intended to provide an exclusive or exhaustive explanation of what is claimed. The detailed description is included to provide further information about the subject matter of the present patent application.

The following detailed description includes references to the accompanying drawings, which form a part of the detailed description. The drawings show illustrations in accordance with example embodiments. These embodiments, which are also referred to herein as "examples," are described in enough detail to enable those skilled in the art to practice the current subject matter. The embodiments may be combined, other embodiments may be utilized, or structural, logical and electrical changes may be made without departing from the scope of what is claimed. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive or, such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

FIG. 1 is a block diagram illustrating a communication system 100, in accordance with an example embodiment. The communication system 100 is shown to include a user interface 102 coupled to a machine 106, via communication channels 103, 105 and a communication bus 104.

The user interface 102 may be a hardware user interface to allow for communication with software and/or hardware on the machine 106. In an example embodiment, the communication bus 104 is a Universal Serial Bus (USB) and the user interface 102 is a port connecting to the USB. The user interface 102 may alternatively or additionally be a software user interface on a user device (not shown) to allow for communication with hardware and/or software on the machine 106.

In some example embodiments, the user interface 102 may include web browser (not shown) that may be used to request access to the machine 106 via the Internet. In those particular example embodiments, the communication bus 104 may include the Internet.

The example machine 106 includes a security module 108. It is to be appreciated that the security module 108, and the functionality explained in the various example embodiments included herein, may operate outside of the machine 106. The security module 108 is shown to include multiple other modules (each discussed in turn below) and illustrates their structural and/or communicatory relationships to one another. Each of the modules serves to implement functionality described in the example embodiments. The modules may be software instructions or hardware such as hardwired circuitry programmed to implement logic. Some example embodiments may include modules that are a combination of software and hardware or hardwired circuitry, etc.

The example security module 108 includes a weak authentication detection module 110, a challenge module 130, an authentication module 120, a trend monitoring module 150 and a communication module 140, which are all communicatively coupled with one another via the communication channels 107, 109, 111, 113 and 115 respectively. The security module 108 is further shown to include database(s) 114 communicatively coupled to and accessible by the modules via communication channel 117 and an option module 112. The option module 112 is shown to be coupled with the weak authentication detection module 110, the challenge module 130, the communication module 140 and the authentication module 120 via the communication channels 119, 125, 121 and 123 respectively. It is to be appreciated that the modules and database(s) referenced above need not be enclosed within, or confined to, the security module 108. Example embodiments may include maintaining the structural and/or communicatory relationships between the modules, independent of the security module 108.

The communication module 140 may be used to facilitate all types of communications associated with the security module 108 via the communication bus 104 and/or the communication channels 103, 105, 107, 109, 111, 113, 115, 117, 119, 121, 123, and 125. The communications may include those between the modules within the security module 108 and those made via the user interface 102. Any of the various communication protocols may be employed.

The weak authentication detection module 110 is to receive user authentication requests via the user interface 102 and inspect the authentication requests to determine whether authentication data provided in a request is weak. The weak authentication detection module 110 may identify weak authentication data by referencing a list of known weak authentication data (e.g., data organized in the database 114, discussed in more detail below).

In an example embodiment, a user may include a human being or software associated with the user interface 102. As explained above, the user interface may be connected to the machine 106 via the communication bus 104, which may connect a further device (not shown) that is local to or remote from (e.g., over a wide area network (WAN)) the machine 106.

In the various example embodiments discussed herein, authentication data includes usernames and passwords. Other authentication data (e.g., hardware tokens, biometric devices, other forms of shared secrets including transactional, or behavioral data, PIN numbers) known in the art may be employed in other example embodiments. The attributes that make authentication data weak may depend on the nature of the authentication data. When authentication data is a password, the authentication data may be considered to be weak if the password is considered to be weak. Whether a password is weak may be determined in various ways. In an example embodiment, a weak password is a password that is a substring of the username submitted with the password. Likewise, a username may be considered weak if the username is a substring of the password. It is to be noted that example techniques described with respect to weak passwords may also be implemented with respect to weak usernames.

In an example case, the password "123" would be considered a weak password if the corresponding username was "ABC123." The password "123" would not be considered a weak password if the corresponding username was "ABC456" because then the password "123" would not be a subset or substring of the username.

In an example embodiment, substrings may be configurable to vary the strictness of a security policy. For example, the system may be configured to match any "2 character substrings", in which case for the username "testusername" and password "Stalingrad," the password would be considered weak because the substring "st" in the "Stalingrad" is a 2 character substring of the testusername.

The database 114 may include a data structure stored in a memory or storage device. In some example embodiments, the data structure employed is a relational database, but any appropriate data structure would suffice. In an example embodiment, the database 114 holds a list of known weak passwords (e.g., weak authentication data) to be accessed by the weak authentication detection module 110. The database may also hold a list of machines and/or users that are considered "safe," perhaps because the machine and/or user has previously interacted with or accessed the machine 106. More details on the contents of the example data structure are described below.

The challenge module 130 may test whether a human being is associated with a password received by the device. In an example embodiment, the user is challenged with a CAPTCHA image designed to test whether the user is a human being. If the user is not determined to be human, the user may be malicious code or some other software, etc.

The user/device detection module 132 is to determine whether a received username and password have been submitted by a user and/or device is considered to be "safe." A safe user may be a user who has previously been determined to be a human user or is otherwise considered to be safe. A safe device may be a device that is associated with a human user or is otherwise considered to be safe. The user/device detection module 132 may reference the database 114 and/or a user device (e.g., a cookie in the user's device) to determine whether the user and/or device are considered to be safe.

The authentication module 120 is to authenticate a user's identity. To do so, the authentication module 120 may compare a submitted username and password with a list of registered usernames and passwords. The list of usernames and passwords may be stored in and accessed from the database 114. If the authentication module 120 is able to match the submitted username and password with a registered username and password, then the user may be granted a level of access to the machine 106. Otherwise, the user is not granted access to the machine 106.

The option module 112 is to present a user with an option to change a weak password to a password that is not considered to be weak. In an example embodiment, when the weak authentication detection module 110 determines a password to be weak and the authentication module 120 authenticates the user, the option module 112 may present the user with an option to change the user's password. The option module 112 may provide the option via an email communication giving a recipient the option to initiate the password change by following an Internet link from the email address to a web page hosted by the network system. Alternatively or additionally, the option module 112 may provide the option as a web link to the web page at the time the weak password is submitted.

The trend monitoring module 150 is to monitor the number of challenges presented to users by the challenge module 130 and the number of challenges that are solved by the users. An example analysis of the data collected above may yield a number malicious code attempts to gain access to the machine 106. Further, it may be useful to track the effect of enforcing the challenge on users to determine whether users are willing to solve the challenge or opt to abandon the login procedure (e.g., and potential transactions once logged in).

Figures 2, 3, 4:
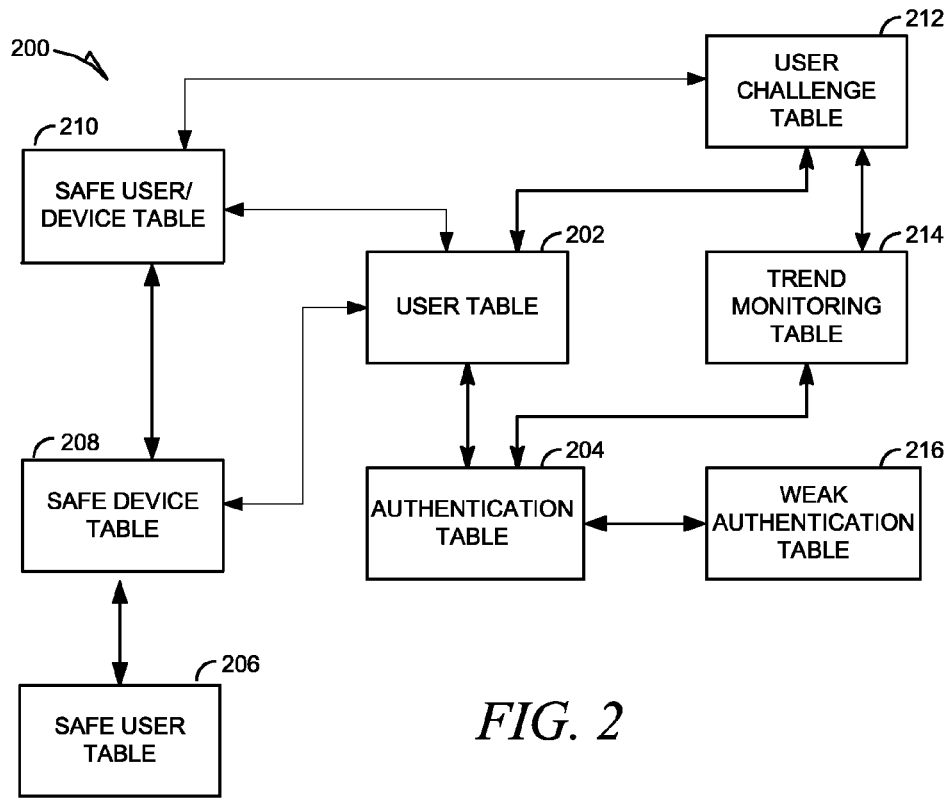
FIG. 2 is a high-level entity-relationship diagram, illustrating various tables, in accordance with an example embodiment.
FIG. 3 shows an authentication table including authentication data, in accordance with an example embodiment.
FIG. 4 shows a weak authentication table including weak authentication data, in accordance with an example embodiment.

FIG. 2 is a high-level entity-relationship diagram, illustrating various tables 200 that may be maintained within the database 114, and that are utilized by and support the modules within the security module 108.

A user table 202 contains a record for each user registered to access the machine 106 and may include various identifiers depending on the purpose of accessing the machine 106. For example, if the example machine 106 were part of a commerce system, registration information may include address and financial instrument information pertaining to each such registered user.

The tables 200 also include an authentication table 204 in which authentication data corresponding to each registered user is maintained. FIG. 3 shows an authentication table 300 including authentication data, in accordance with an example embodiment. The table is shown to include a user column 304 and columns 306, 308, 310 for each set of authentication data 1-3 included in an authentication request. In response to a request to authenticate a user, the example authentication module 120 may reference or look-up authentication data in the authentication table 300 and determine whether a particular registered user corresponds to the authentication data in the authentication request. Some example embodiments include further authentication data (not shown) to be provided during user authentication. Each user identification (ID) (e.g., U1, U2) and corresponding authentication data within the authentication table 300 may be linked to one or more user records within the user table 202, so as to associate a user with the authentication data. One or more sets of authentication data in the table 300 may be checked against the weak authentication table 216, so as to identify known weak passwords being used by users.

The weak authentication table 216 is to hold a list of known or derived weak authentication data. FIG. 4 shows a weak authentication table 400, including weak authentication data, in accordance with an example embodiment. The table 400 is shown to include a column 404, 406 for each of authentication data columns 1-2 and a column for corresponding weak authentication data 408.

In an example embodiment, the weak authentication table 400 may be dynamic as passwords may be added to and/or removed from the list. Newly identified weak passwords may be added to the list in real time, periodically or sporadically (e.g., by an administrator).

The example weak authentication detection table 216 may reference the weak authentication table 400 to compare received passwords with those listed in the weak authentication table 400 in column 408. Alternatively or additionally, the weak authentication detection module 110 may first derive (e.g., compute) a list of weak passwords from a received username and store the weak passwords that have been derived in column 408 of the weak authentication table 400. For example, a submitted username and password may be placed in columns 404 and 406 and the password (e.g., password 111) may be compared to derived substrings to identify whether the submitted password matches a weak password.

For the username: "usernameabc" in column 404, the weak authentication data derived and written to the table 408 may be "user," "name," and "abc" because these strings are substrings of the username. As explained above, various other criteria may determine what attributes render a password weak. Since the example password "password111" in column 406 does not match the weak authentication data in column 408, the password would not be considered weak.

Figure 5:
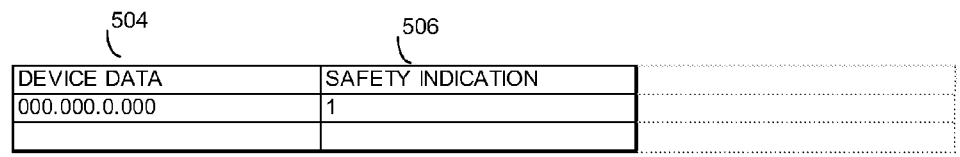
FIG. 5 shows a safe device table including safe device data, in accordance with an example embodiment.

The safe device table 208 may hold a list of devices that are designated as safe or unsafe. FIG. 5 shows a safe device table 500, including device data, in accordance with an example embodiment. The table 500 is shown to include a device data column 504 and a safety indication column 506. The safety of particular devices may be known by administrators, for example, to be associated with malicious attacks. Those devices may be designated unsafe while other devices, based on industry intelligence or any other information source, may be designated safe. The safe device table 208 may be linked to the safe user/device table 210 to associate safe users with safe devices. Alternatively or additionally, the safe device table 208 may be accessed by the user/device detection module 132 to identify a safe device.

Figure 6:
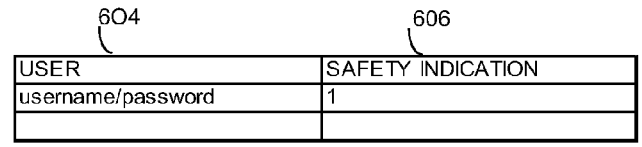
FIG. 6 shows a safe user table including safe user data, in accordance with an example embodiment.

The safe user table 206 may hold a list of users that have previously been determined to be human users. FIG. 6 shows a safe user table 600, including user data, in accordance with an example embodiment. The table 600 is shown to include a column for a user 604 (e.g., a user's username and password) and a column to indicate whether the user is safe 606 (e.g., Yes="1" and No="0"), or some other indicator of whether a user is safe, etc.). In some example embodiments, users known to be safe or unsafe populate the table 600.

Alternatively or additionally, the challenge module 130 may populate the fields of the table 600 (e.g., dynamically) based on the results of user challenges (e.g., CAPTCHAs) presented to users to determine whether a user is human. The safe user table 600 may be linked to the safe user/device table 210 to associate safe users with safe devices. Alternatively or additionally, the safe user table 206 may be accessed by the user/device detection module 132 to identify a safe user.

Figure 7:
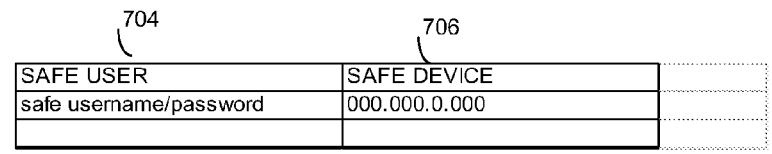
FIG. 7 shows a safe user/device table including safe user and safe device data, in accordance with an example embodiment.

The safe user/device table 210 may include a list of safe users that correspond to safe devices. Once the table 210 has been populated, it may be referenced to determine that a particular authorization request originated from a safe user and device. FIG. 7 shows a safe user/device table 700, including safe user and safe device data, in accordance with an example embodiment. The example safe user/device table 700 is shown to include a safe user column 704 and a safe device column 706.

In an example embodiment, the user/device detection module 132 may populate the table 700 by first detecting a username, password and IP address associated with a request for authorization. The user/device detection module 132 may reference the safe user table 600 to determine whether the user is safe. If the user is safe, the safe device table 500 may be referenced to determine whether an IP address of the source has been designated safe or whether a fingerprint of the device associated with a safe device.

A device fingerprint may be defined by one or more attributes of a device. Attributes of a device may include browser type and version, operating system, hardware address, computer name. If the IP address is safe, the safe user (e.g., username/password) and the safe device (e.g., IP address) may be entered into the safe user/device table 700.

If the user in the example requests access from the same device again, the user/device detection module 132 may be able to reference the single table 700 to quickly determine that the user from the device is safe (e.g., the user is human and not malicious code or a compromised device) and should be allowed to begin an authorization process.

It is to be appreciated that the determination of whether a user and machine are safe may be determined by setting and accessing a cookie in the device requesting authorization or via other device identification and/or fingerprinting techniques. Such an example technique may be independent of the use of the user/device table 700 described above.

The trend monitoring table 214 may store records related to user challenges, authentications, and transactional trends and make accessible associations between the numbers of users solving challenges, authenticating and eventually being involved in a transaction.

Figure 8:
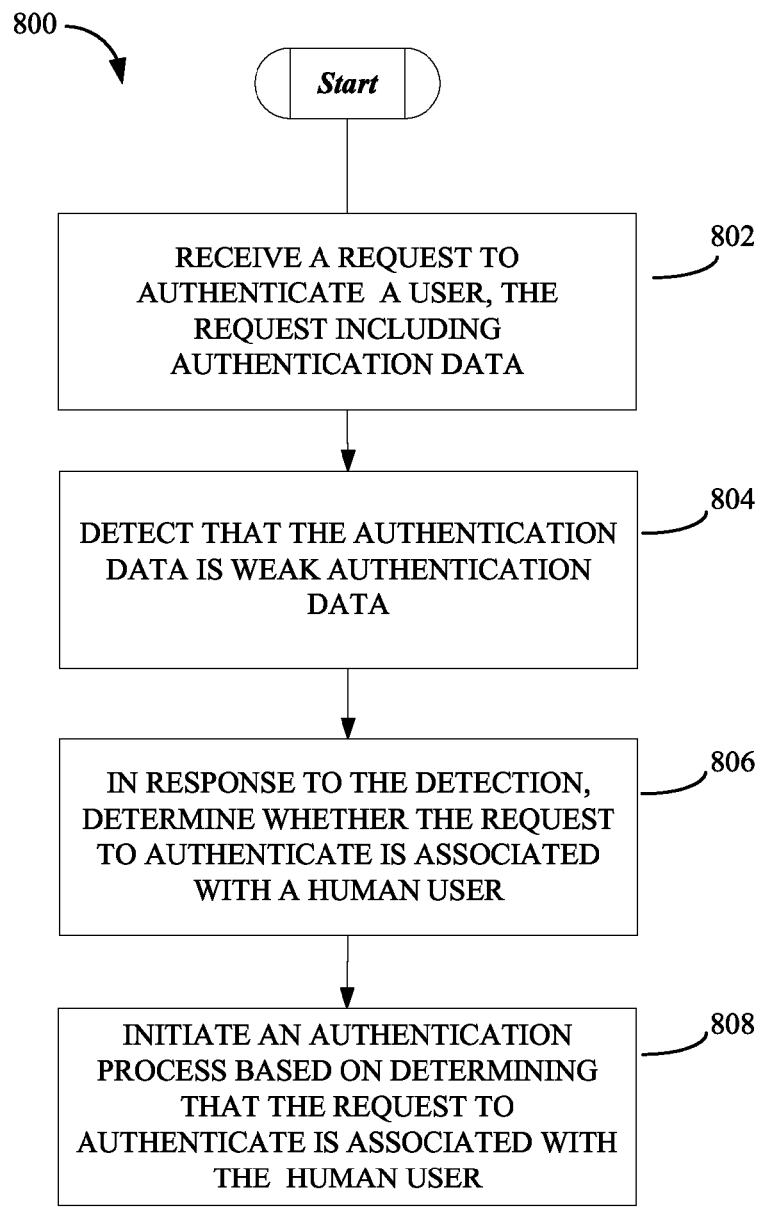
FIG. 8 is a flow chart illustrating a method of weak authentication data limiting, in accordance with an example embodiment.

FIG. 8 is a flow chart illustrating a method 800 of weak authentication data limiting, in accordance with an example embodiment. In various example embodiments, the method is carried out by the security module 108 referred to in FIG. 1.

The method 800 of FIG. 8 begins at block 802 with receiving a request that includes authentication data to authenticate a user. In FIG. 1, the example communication module 140 within the machine 106 may receive the request through the user interface 102 via the communication channels 103, 105, 115 and communication bus 104.

At block 804, the method 800 includes detecting that the authentication data included within the request is weak authentication data. In an example embodiment, the weak authentication detection module 110 accesses the weak authentication table 216 in the database 114 to detect (e.g., by referencing a look-up table) that the authentication data included in the request is weak authentication data.

As provided above, authentication data may include authentication data in the form of a username and authentication data in the form of a password. Example usernames and passwords may be defined by one or more strings of alphanumeric characters (e.g., see username and password of FIG. 3 in columns 306, 308). When authentication data includes a password, whether the password is weak may be determined using the various techniques described above.

At block 806, responsive to detecting the weak authentication data, the method 800 includes determining whether the request to authenticate is associated with a human user. In an example embodiment, the challenge module 130 determines (e.g., via a CAPTCHA challenge) that a human user is the source of the request to authenticate.

At block 808, the method 800 includes initiating an authentication process based on determining that the request to authenticate is associated with a human user. If authentication data include username and password, the authentication process may include the authentication module 120 comparing the received username and password to a username and a password associated in the authentication table 204 with a registered user.

In an example embodiment, if the challenge module 130 determines that the source of the request is a human user, the authentication module 120 responds by initiating the authentication process (e.g., to determine whether the human user should be allowed to access the machine 106).

A user who successfully authenticates may be offered an option by the option module 112 to change the weak authentication data to different authentication data that is not weak.

If, however, the example challenge module 130 determines that the source of the request to authenticate is not human, the example authentication module 120 may stop or reject initiation of the authentication process.

Figure 9:
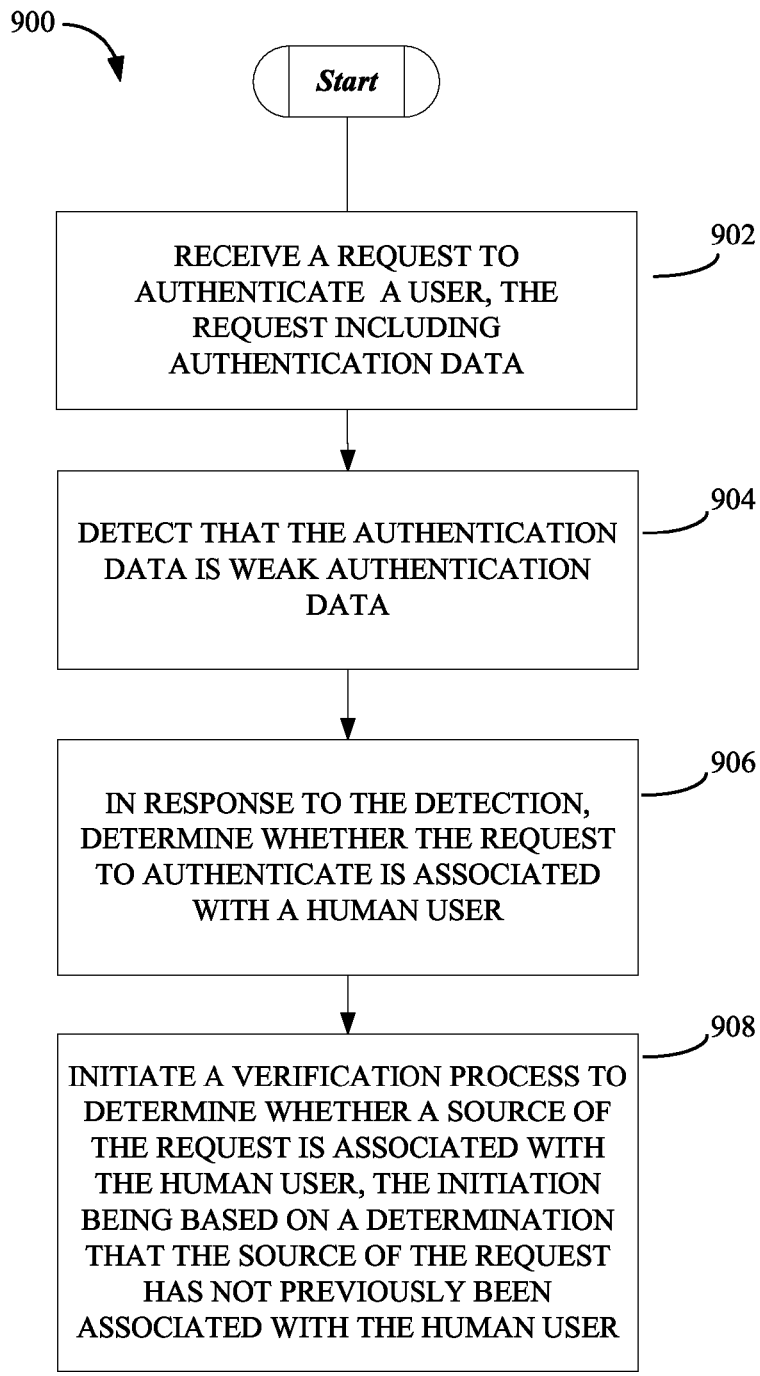
FIG. 9 is a flow chart illustrating a further method of weak authentication data limiting, in accordance with an example embodiment.

FIG. 9 is a flow chart illustrating a further method 900 of weak authentication data limiting, in accordance with an example embodiment. Blocks 902, 904 and 906 may include substantially the same method as 802-806 in the method 800. Block 908 differs from block 808.

At block 908, the method 900 may include initiating a verification process to determine whether the source of an authentication request is associated with the human user, based on an initial determination that the source of the request is not associated with the human user.

When weak authentication data is detected by the weak authentication detection module 110, the user/device detection module 132 within the challenge module 130 may respond by detecting whether the user has previously been determined to be a human user. In an example embodiment the user/device detection module 132 responds by accessing the safe user/device table 210 within the database 114 to determine whether the source of the request can be found on a safe user/device list.

Alternatively or additionally, the user/device detection module 132 may detect whether the request is associated with a recognized IP address or device fingerprint by referencing one or more cookies stored within the source device or calculating the fingerprint of a device.

If the user/device detection module 132 does not determine the source to be associated with a human, the challenge module 130 may, in response, initiate a verification process (such as CAPTCHA for example) to determine whether a source of the request is associated with the human user.

Figure 10:
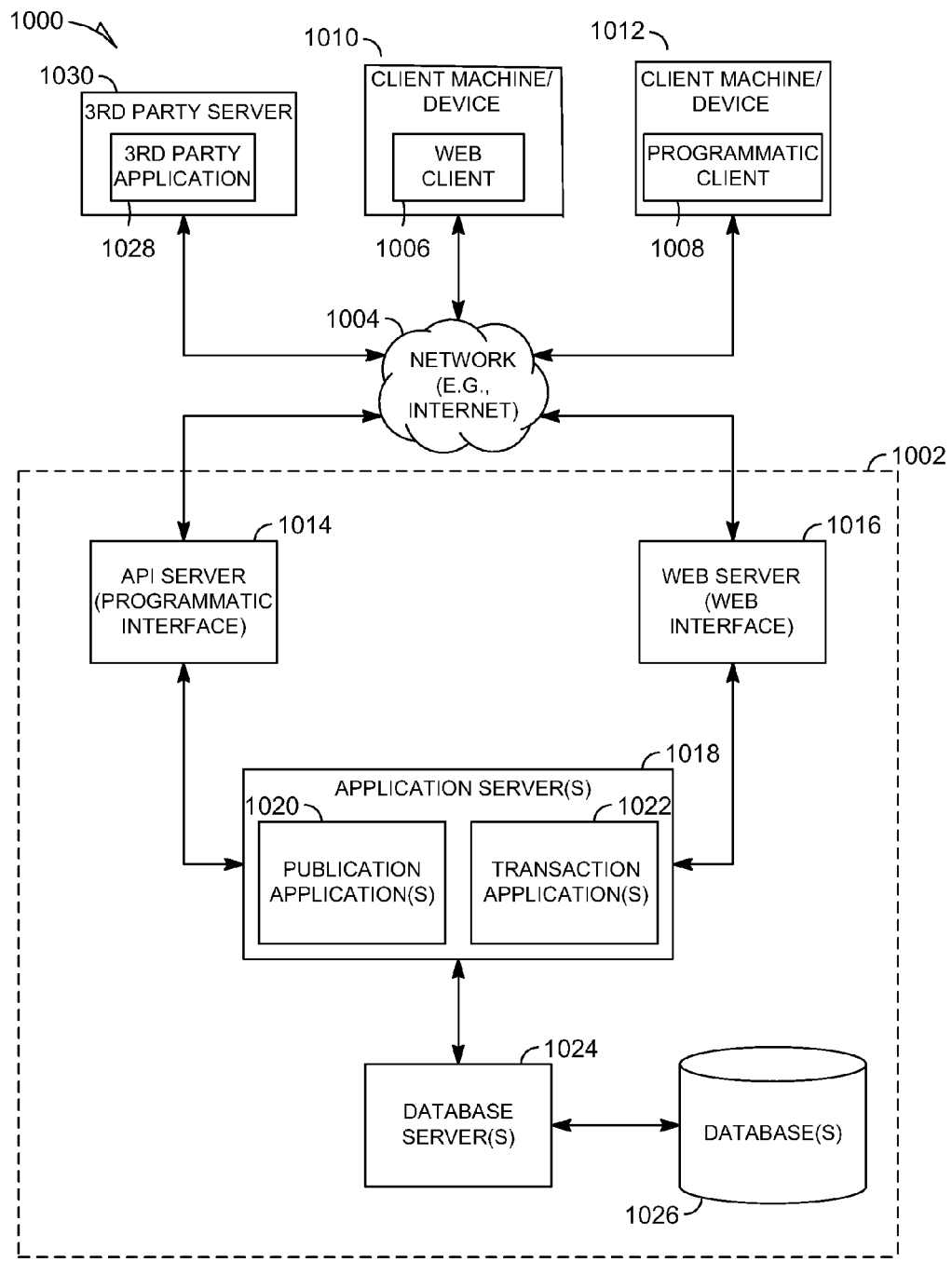
FIG. 10 is a block diagram illustrating an electronic system, in accordance with an example embodiment.

FIG. 10 is a block diagram illustrating a network-based system 1000 in accordance with an example embodiment. A network-based system 1002 (e.g., a network-based financial, publication or commerce system) provides server-side functionality via a network 1004 (e.g., the Internet) to one or more clients, such as a web client 1006 (e.g., a browser, such as the Internet Explorer browser developed by Microsoft Corporation of Redmond, Wash. or the FireFox browser provided by Mozilla Corporation of Mountain View, Calif.), and a programmatic client 1008 executing on respective client machines or devices 1010 and 1012. An Application Program Interface (API) server 1014 and a web server 1016 may be coupled, and provide program and web interfaces respectively, to one or more application servers 1018.

The web client 1006 may be used to access the various commerce and transaction applications 1020 and 1022 via the web interface supported by the web server 1016. The example embodiments described herein may be used to prevent malicious software from using the web client 1006 to gain unauthorized access (e.g., through brute force attacks) to the application servers 1018. In an example embodiment, the buyer, using a web client 1006, initiates user logins, submits searches for items, browses an electronic marketplace for items, and completes transactions via the network 1004 and the web server 1016.

Similarly, the programmatic client 1008 can access the various services and functions provided by the publication and transaction applications 1020 and 1022 via the program interface of the API server 1014. The programmatic client 1008 may, for example, comprise a seller application to access and manage account information located within the application servers 1018. The programmatic client 1008 may also enable sellers to submit listings to the system 1002 and receive recommended publication data in return. In addition to its application to a web client 1006, the example embodiments described herein may assist in discouraging malicious software from launching brute force attacks through the programmatic client 1008 and the API server 1014.

The application servers 1018 may host one or more publication applications 1020 and transaction applications 1022. The application servers 1018 may, in turn, be coupled to one or more database servers 1024 that facilitate access to one or more databases 1026. In example embodiments, the security module 108, as described with respect to FIG. 1, may be included within the publication applications 1020, and may interact with the database server 1024 and the databases 1026 to access authentication data, user information and any other security related information.

The transaction applications 1022 provide a number of transaction functions and services to users that access the system 1002. While the publication and transaction applications 1020 and 1022 shown in FIG. 10 form part of the network-based system 1002, it will be appreciated that, in some embodiments of the subject matter, the transaction applications 1022 may form part of a transaction service that is separate and distinct from the system 1002. The various publication and transaction applications 1020 and 1022 can also be implemented as standalone software programs with or without individual networking capabilities.

A third party application 1028, executing on a third party server machine 1030, may also have programmatic (e.g., computer-implemented) access to the network-based system 1002 via the program interface of the API server 1014. For example, the third party application 1028 may, utilizing information retrieved from the network-based system 1002, support one or more features or functions on a website hosted by the third party. The third party website may, for example, provide one or more promotional, commerce, or payment functions that are supported by the relevant applications of the network-based system 1002. The security applications disclosed herein may further be employed to protect against brute force attacks launched from the third party applications 1028.

Figure 11:
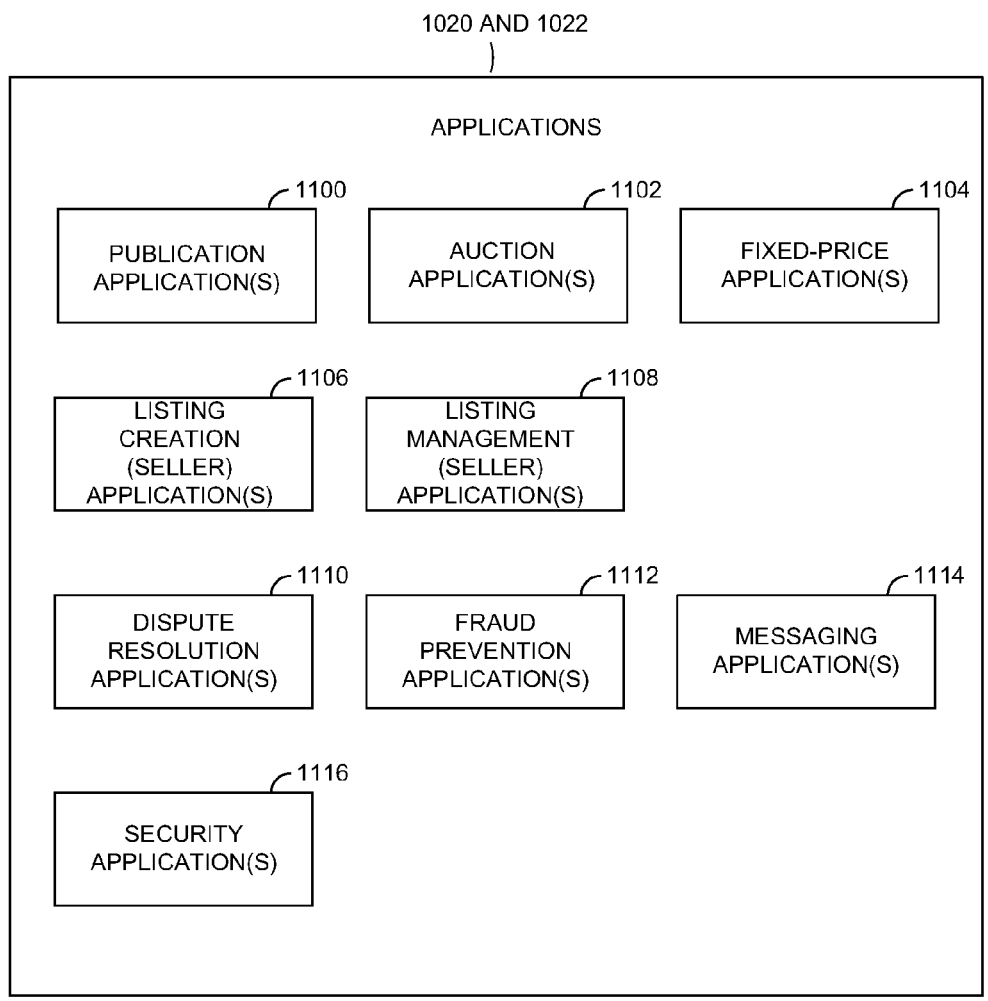
FIG. 11 is a block diagram illustrating multiple applications that are provided as part of networked system, in accordance with an example embodiment.

FIG. 11 is a block diagram illustrating multiple applications 1020 and 1022 that, in one example embodiment, are provided as part of the networked system 1002. The applications 1020 may be hosted on dedicated or shared server machines (not shown) that are communicatively coupled to enable communications between server machines. The applications themselves are communicatively coupled (e.g., via appropriate interfaces) to each other and to various data sources, so as to allow information to be passed between the applications or so as to allow the applications to share and access common data. The applications may furthermore access one or more databases 1026 via the database servers 1024.

The networked system 1002 may provide a number of publishing, listing and price-setting mechanisms whereby a seller may list (or publish information concerning) goods or services for sale, a buyer can express interest in or indicate a desire to purchase such goods or services, and a price can be set for a transaction pertaining to the goods or services. To this end, the publication applications 1020 are shown to include at least one publication application 1100 and one or more auction applications 1102 which support auction-format listing and price setting mechanisms (e.g., English, Dutch, Vickrey, Chinese, Double, Reverse auctions etc.). The various auction applications 1102 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 1104 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with auction-format listings, and allow a buyer to purchase goods or services, which are also being offered for sale via an auction, for a fixed-price that is typically higher than the starting price of the auction.

Listing creation applications 1106 allow sellers to conveniently author listings pertaining to goods or services that they wish to transact via the networked system 1002, and listing management applications 1108 allow sellers to manage such listings. Specifically, where a particular seller has authored and/or published a large number of listings, the management of such listings may present a challenge. The listing management applications 1108 provide a number of features (e.g., auto-relisting, inventory level monitors, etc.) to assist the seller in managing such listings.

Dispute resolution applications 1110 provide mechanisms whereby disputes arising between transacting parties may be resolved. For example, the dispute resolution applications 1110 may provide guided procedures whereby the parties are guided through a number of steps in an attempt to settle a dispute. In the event that the dispute cannot be settled via the guided procedures, the dispute may be escalated to a third party mediator or arbitrator.

A number of fraud prevention applications 1112 implement fraud detection and prevention mechanisms to reduce the occurrence of fraud within the networked system 1002.

Messaging applications 1114 are responsible for the generation and delivery of messages to users of the networked system 1002, such messages, for example, advising users regarding the status of listings at the networked system 1002 (e.g., providing "outbid" notices to bidders during an auction process, to provide user to user transactional or non-transactional communications or to provide promotional and merchandising information to users). The messaging applications 1114 may work in conjunction with or include the communication module 140 of FIG. 1. Respective messaging applications 1114 may utilize any one of a number of message delivery networks and platforms to deliver messages to users. For example, messaging applications 1114 may deliver electronic mail (e-mail), instant message (IM), Short Message Service (SMS), text, facsimile, or voice (e.g., Voice over IP (VoIP)) messages via the wired (e.g., the Internet), Plain Old Telephone Service (POTS), or wireless (e.g., mobile, cellular, WiFi, WiMAX) networks.

Security applications 1116 support various security functions for the purpose of protecting the networked system 1002 from various types of attacks. The security applications 1116 or parts thereof may interact with the fraud prevention applications 1112. In some embodiments, the security applications 1116 may be included within the fraud prevention applications 1112 and vice versa. Several example embodiments describing the functions and operations of the security applications are explained in further detail below.

Figure 12A:
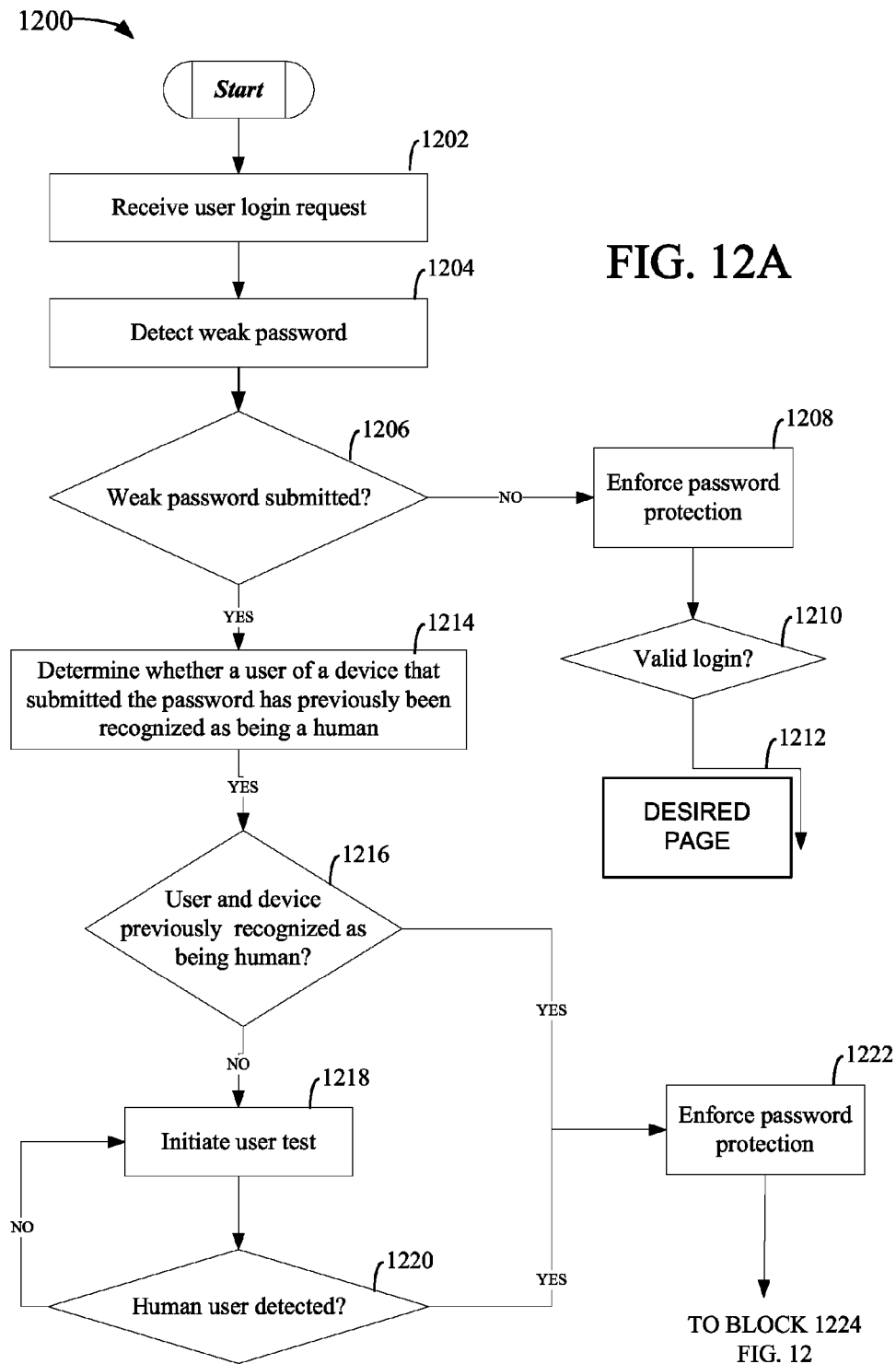
FIGS. 12A and 12B provide a graphical flow diagram illustrating a method of weak password limiting, in accordance with an example embodiment.
Figure 12B:
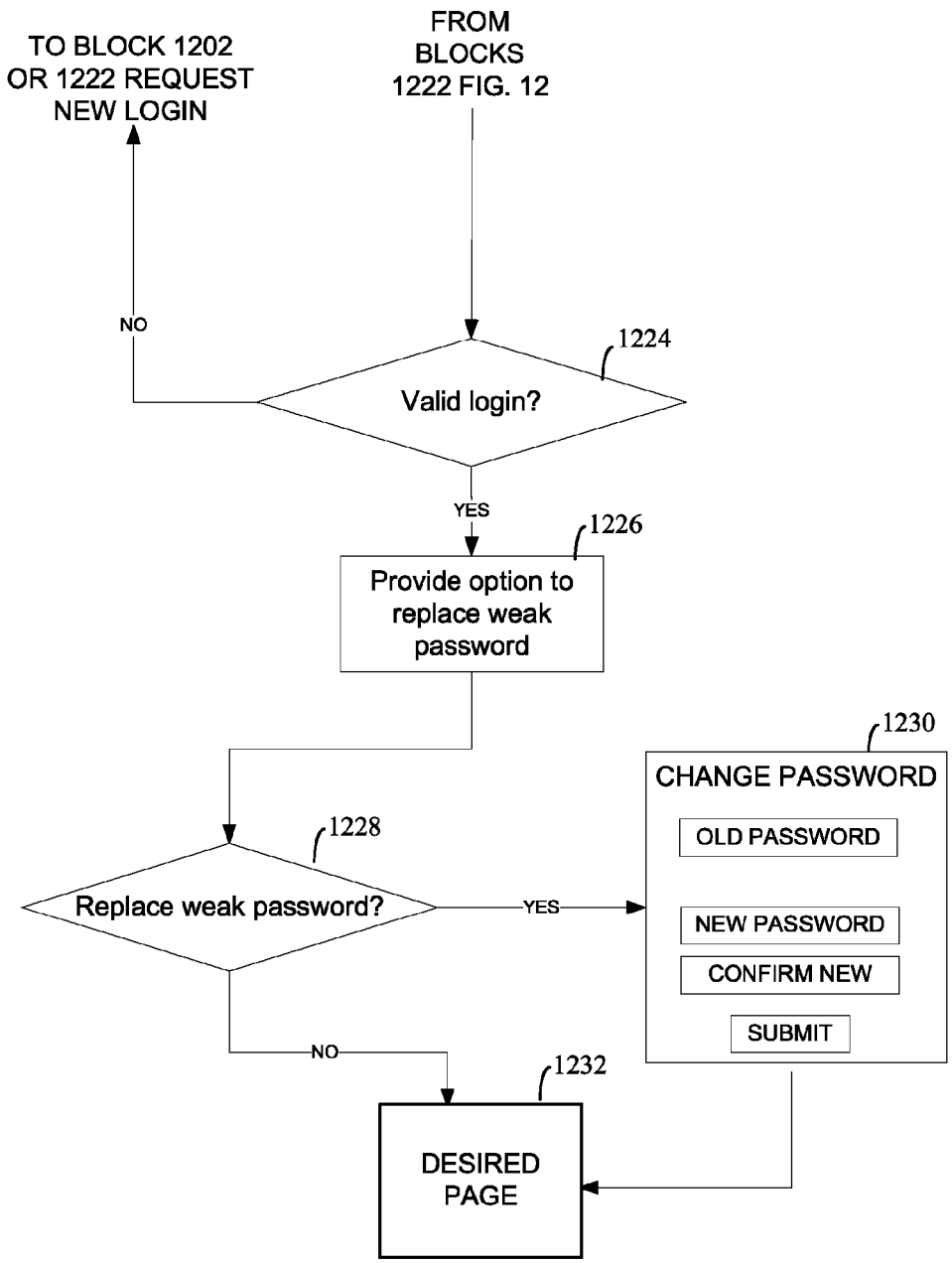

FIGS. 12A and 12B provide a graphical flow diagram illustrating a method 1200 of weak password limiting, in accordance with an example embodiment. The method 1200 may be performed by the security applications 1116 of FIG. 11 and, in some embodiments, with the various modules described above with respect to FIGS. 1, 8 and 9.

The method 1200 begins at process block 1202 with receiving a user login request in the form of a username and password as well as a request to access a machine. Referring to FIG. 10, the request may be received from the client machine or device 1010 by the application servers 1018.

Blocks 1204 and 1206 show a directive to detect a weak password and at decision block 1206 that includes detecting whether the password received at process block 1202 is a weak password. If the password is not determined to be weak, the method 1200 proceeds to process block 1208, which includes a directive to enforce password protection upon the submitted username and password. If at decision block 1210 it is determined that the login is valid, the process continues at graphical block 1212 with allowing the user to access his or her desired page.

If it is detected at decision block 1206 that a weak password was submitted, the method 1200 proceeds to process block 1214 and decision block 1216, where the method 1200 includes determining whether a user of a device that submitted the password has previously been recognized as being human.

In response to a user not previously being recognized, process block 1218 and decision block 1220 include initiating a test (e.g., CAPTCHA) to determine whether the user of the device is currently recognized as being human. Any test appropriate to detect whether software or a human has submitted a login request may be employed.

Figure 13:
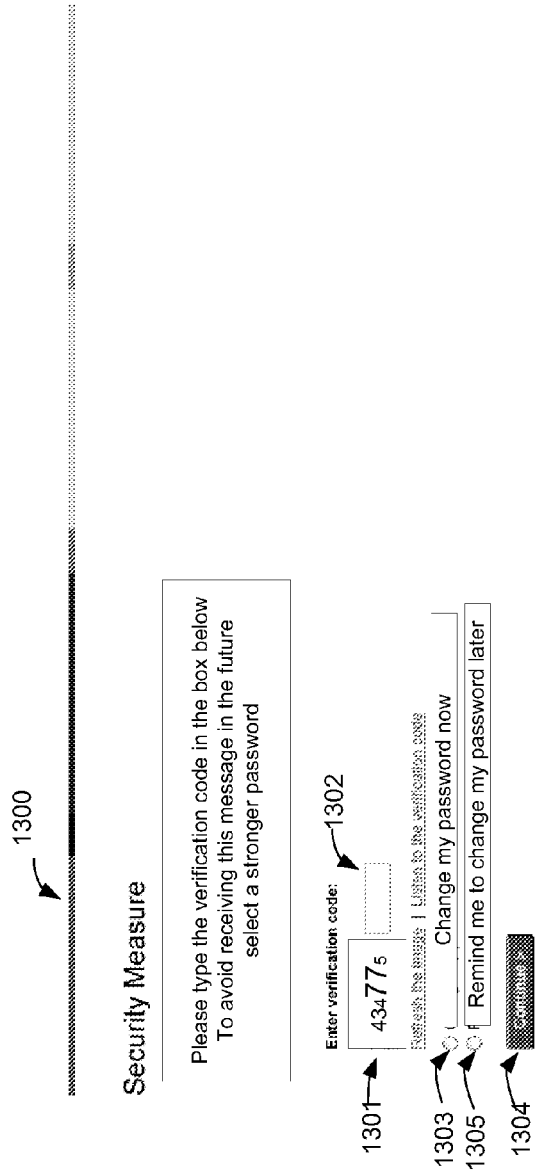
FIG. 13 shows an example interface screen including a verification challenge, in accordance with an example embodiment.

FIG. 13 shows an example interface screen 1300, including a CAPTCHA 1301 to test a user by requesting that alphanumeric characters are to be reentered into the text box 1302 by a user. In this example user interface, the user is given the option to change the user's password in lieu of having to reenter the verification code (e.g., the image CAPTCHA). The user may indicate a desire to change passwords by clicking the radio button 1303 and then clicking continue 1304. Otherwise, the user may reenter the verification code and click the continue button 1304 to proceed with login.

The user may select radio button 1305 to elect to be reminded to change its password later. In an example embodiment, a subsequent email communication may be sent giving the recipient an option to initiate the password change by following an internet link to a web page hosted by the example network system. Alternatively or additionally, the user may be given a web link to the example interface screen (e.g., a web page) 1300 at the time of a subsequent weak password detection.

Figure 14:
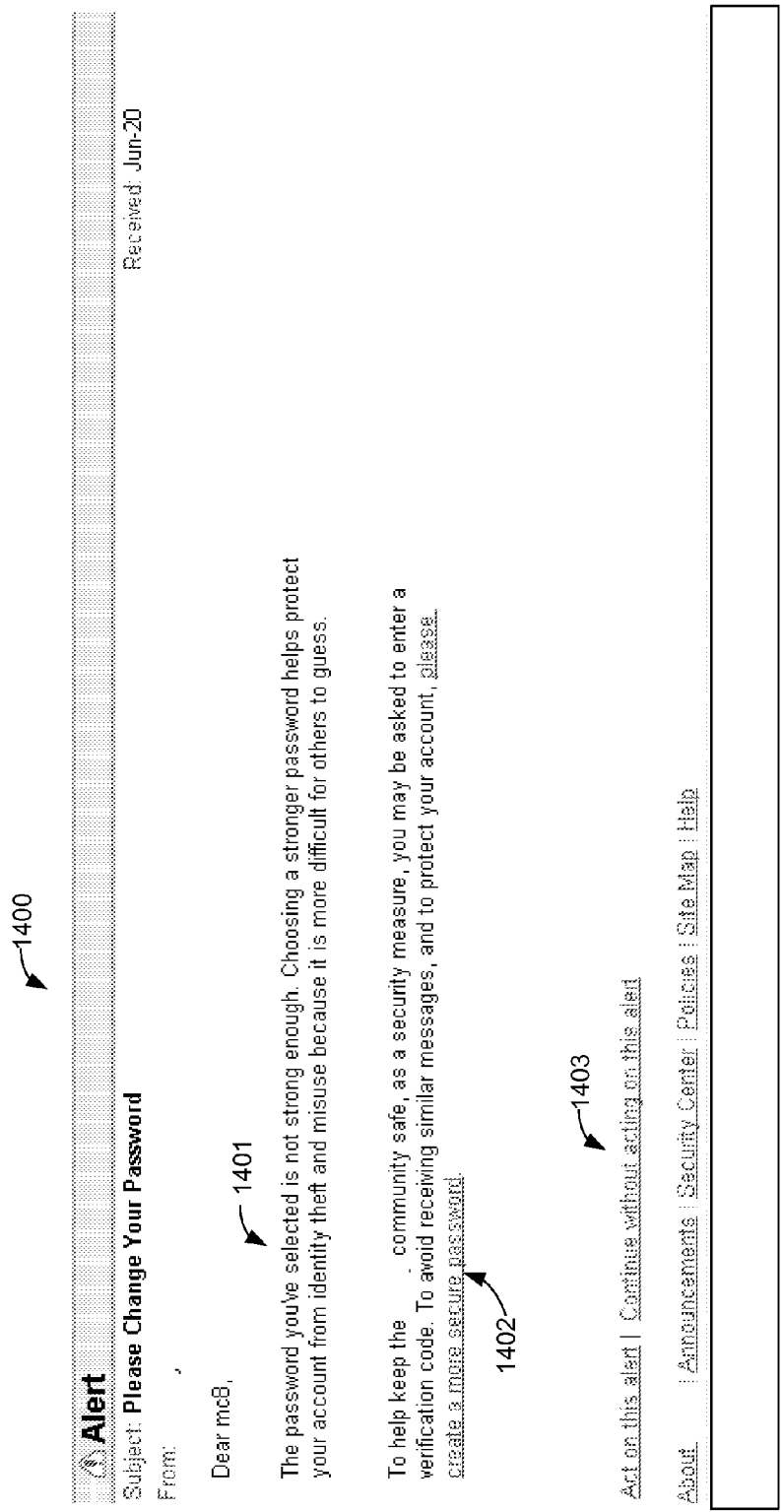
FIG. 14 shows an example email notification providing an option to replace a weak password, in accordance with an example embodiment.

FIG. 14 shows example email notification 1400 providing the option to replace the weak password, in accordance with an example embodiment. In FIG. 14, the text 1401 indicates to the user that the user's password is not strong. The text 1402 is a clickable link to one or more additional web pages that facilitate the password change process. A user may also click the text 1403 which allows the user to navigate away from the web email page without initiating the password change process. In some example embodiments, the user is required to change passwords and is not given further access until he or she has done so.

In some example embodiments, a source's failure of the verification test (e.g., indicating that the user is not determined to be human) results in the user being looped back in the method 1200 to a repeated verification test to determine whether the user is human. This is indicated by the arrow labeled "NO" from decision block 1220 to process block 1218.

If the user has previously been recognized as being human at decision block 1216 or if the user is currently recognized as being human (e.g., the user passes the test indicating that the user has been determined to be human) at decision block 1220, the process continues at process block 1222, where password protection is enforced upon the user submitting the username and password (see FIG. 13).

FIG. 12B continues the flow chart of FIG. 12A, following a directive to enforce password protection at process block 1222. At 1224, if a user's username and password are invalid the method 1200 may return to 1202 at the beginning of the method to re-start the authentication process. In an example embodiment, a user is given a number of attempts (e.g., three) to login before the user is returned to the start of the method and having to prove he or she is human.

In the event that the login information is valid, process block 1226 and decision block 1228 may provide the user an option prior to the user being authenticated, to replace the weak password with a different password that is not weak (e.g., a strong password) at graphical block 1230.

If the user changes passwords or given the option, elects not to change passwords, the user may be granted access to the desired page as indicated by the graphical block 1232.

In an example embodiment, the number of verification tests (e.g., to determine whether a user is human) issued responsive to requests to authenticate are counted (e.g., by the trend monitoring module 150). Likewise, the number of verification tests that have been solved by the sources (e.g., users) are counted. Such information may be used to assess an affect of the verification challenges on users' behavior. In a further example embodiment, the number of users who proceed to authenticate after being recognized as being human is counted. This example embodiment includes measuring an impact on transaction flow based on the numbers of verification tests, solved verification tests and authentications.

Figure 15:
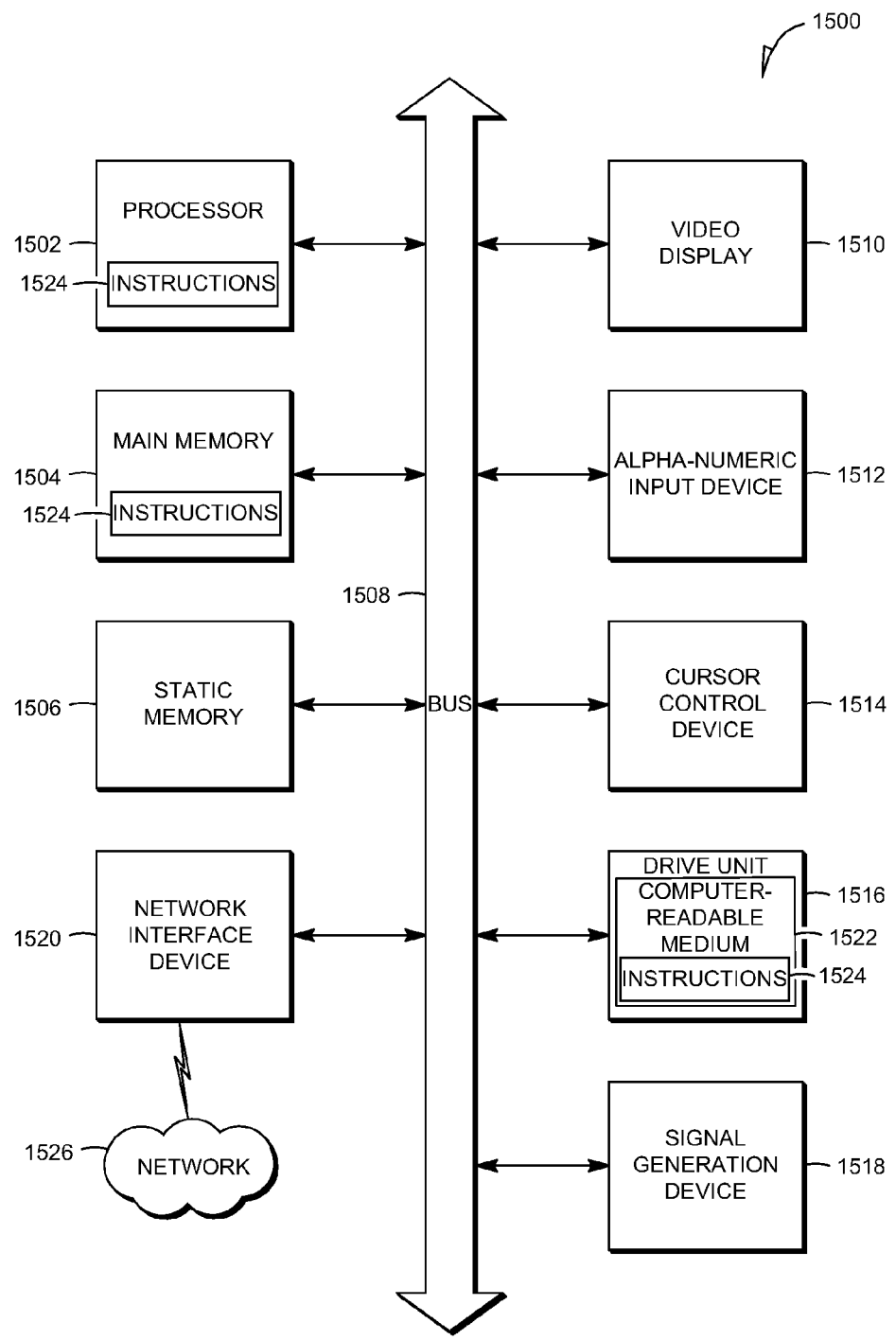
FIG. 15 is a block diagram illustrating a computer system, in accordance with an example embodiment.

FIG. 15 is a block diagram illustrating a computer system or module 1500 in accordance with example embodiments. Within the computer system 1500 are a set of instructions for causing the machine 1500 to perform any one or more of the methodologies discussed herein. In alternative example embodiments, the machine 1500 operates as a standalone device or may be connected (e.g., networked) to other machines (not shown). In a networked deployment, the machine 1500 may operate in the capacity of a server or a client machine in a server-client network environment, or as a peer machine in a peer-to-peer (or distributed) network environment. The machine 1500 may be a personal computer (PC), a tablet PC, a set-top box (STB), a PDA, a cellular telephone, a web appliance, a network router, switch or bridge, or any machine capable of executing a set of instructions (sequential or otherwise) that specify actions to be taken by that machine. Further, while only a single machine 1500 is illustrated, the term "machine" shall also be taken to include any collection of machines that individually or jointly execute a set (or multiple sets) of instructions to perform any one or more of the methodologies discussed herein.

The example computer system 1500 includes a processor 1502 (e.g., a central processing unit (CPU), a graphics processing unit (GPU) or both), a main memory 1504 and a static memory 1506, which communicate with each other via a bus 1508. The computer system 1500 may further include a video display unit 1510 (e.g., a liquid crystal display (LCD) or a cathode ray tube (CRT)). The computer system 1500 also includes an alphanumeric input device 1512 (e.g., a keyboard), a user interface (UI) navigation device 1514 (e.g., a mouse), a disk drive unit 1516, a signal generation device 1518 (e.g., a speaker) and a network interface device 1520.

The disk drive unit 1516 includes a machine-readable medium 1522 on which is stored one or more sets of instructions and data structures (e.g., instructions 1524) embodying or utilized by any one or more of the methodologies or functions described herein. The instructions 1524 may also reside, completely or at least partially, within the main memory 1504 and/or within the processor 1502 during execution thereof by the computer system 1500, the main memory 1504 and the processor 1502 also constituting machine-readable media.

The instructions 1524 may further be transmitted or received over a network 1526 via the network interface device 1520 utilizing any one of a number of well-known transfer protocols (e.g., file transfer protocol (FTP)).

While the machine-readable medium 1522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

The above description is intended to be illustrative, and not restrictive. For example, the above-described embodiments (or one or more aspects thereof) may be used in combination with each other. Other embodiments will be apparent to those of skill in the art upon reviewing the above description. The scope of the claims should, therefore, be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc., are used merely as labels, and are not intended to impose numerical requirements on their objects.

The Abstract is provided to comply with 37 C.F.R. §1.72 (b), which requires that it allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment.

What is claimed is:
1. A method comprising:
receiving a request to authenticate a user, the request to authenticate the user including authentication data that includes a password;
detecting that the authentication data included within the request is weak authentication data by detecting that the password is a weak password;
responsive to detecting the weak authentication data, determining whether the request to authenticate is associated with a human user; and using at least one processor, initiating an authentication process based on determining that the request to authenticate is associated with the human user.

2. The method of claim 1, wherein the authentication data further includes a username, and wherein the username and the password are defined by one or more strings of alphanumeric characters.

3. The method of claim 2, wherein the detecting that the authentication data is weak authentication data further includes detecting at least one of:
that the password includes a substring included in the username; and
that the username includes a substring included in the password.

4. The method of claim 3, wherein the detecting that the authentication data is weak authentication data includes detecting that the password is listed on a weak password list.

5. The method of claim 3, wherein the initiating of the authentication process includes comparing the username and password to a further username and a further password associated with a registered user.

6. The method of claim 5 further comprising:
offering an authenticated user an option to change a weak password to a different password that is not weak.

7. The method of claim 1, wherein the determining whether the request to authenticate is associated with a human user includes:
detecting whether the user has previously been determined to be a human user; and
detecting whether the request is associated with at least one:
a recognized Internet Protocol address; or
a recognized device fingerprint, wherein the device fingerprint is defined by an attribute of a device.

8. The method of claim 1, wherein the determining whether the request to authenticate is associated with a human user includes challenging the user with a challenge-response test.

9. The method of claim 1, including stopping the initiating of the authentication process based on determining that the request to authenticate is not associated with a human user.

10. A system comprising:
a database;
a machine communicatively coupled with a user interface, the machine including a communication module to receive authentication data in a request to authenticate a user, via the user interface;
a weak authentication detection module communicatively coupled to the communication module and the database to access the database to detect that the authentication data included in the request is weak authentication data by detecting that a password in the authentication data is a weak password; and
a challenge module, communicatively coupled to the weak authentication detection module and an authentication module, to determine that the request to authenticate is associated with a human user responsive to a detection of the weak authentication data by the weak authentication module,
the weak authentication module further to initiate an authentication process based on a determination by the challenge module that the request to authenticate is associated with a human user.

11. The system of claim 10, wherein the challenge module includes a user/device detection module to determine that the request is associated with a human user, wherein the user/device detection module is to:
determine whether the user has previously been determined to be a human user; and
determine whether the request is associated with at least one of:
a recognized Internet Protocol address; or
a recognized device fingerprint, wherein the device fingerprint is defined by an attribute of a device.

12. The system of claim 10, wherein the authentication module is to not initiate the authentication process based on a further determination by the challenge module, based on a challenge-response test, that the request to authenticate is not associated with a human user.

13. The system of claim 10, further comprising:
an option module to offer an authenticated user an option to change the weak authentication data to different authentication data.

14. A method comprising:
receiving a request to authenticate a user, the request to authenticate including authentication data that includes a password;
detecting that the authentication data included within the request is weak authentication data by detecting that the password is a weak password;
responsive to detecting the weak authentication data, determining whether a source of the request is associated with a human user; and
using at least one processor, initiating a verification process to determine whether the source is associated with the human user, based on an initial determining that the source of the request is not associated with the human user.

15. The method of claim 14, wherein the source of the request includes the user and a device, and wherein the initial determining of whether the source is associated with the human user further includes detecting whether the device is associated with a recognized Internet Protocol address.

16. The method of claim 15, wherein the detecting whether the device is associated with the recognized Internet Protocol address includes referencing one or more cookies stored within the device.

17. A system comprising:
a database;
a machine communicatively coupled with a user interface, the machine including a communication module to receive authentication data in a request to authenticate a user, via the user interface;
a weak authentication detection module communicatively coupled between the communication module and the database to access the database to detect that the authentication data included in the request is weak authentication data by detecting that a password in the authentication data is a weak password; and
a challenge module including a user/device detection module, to be communicatively coupled with the weak authentication detection module, and to initiate a verification process to determine whether a source of the request is associated with a human user, based on a further determination made by the user/device detection module that the source of the request is not associated with the human user.

18. The system of claim 17, wherein the source of the request includes the user and a device, and wherein the user/device detection module is to determine whether the source is associated with the human user based on whether the device is associated with a recognized Internet Protocol address.

19. The system of claim 18, wherein the user/device detection module is to reference one or more cookies stored within the device to determine whether the device is associated with the recognized Internet Protocol address.

20. A method of preventing a software program from fraudulently obtaining a username and password in a network system comprising:
- receiving a username and password, and a request to access a machine;
- detecting that the password is a weak password;
- determining whether a user of a device that submitted the password has previously been recognized as being human;
- initiating a test to determine whether the user of the device is currently recognized as being human, responsive to determining that the user has not previously been recognized as being human;
- enforcing a user authentication policy upon the user responsive to the user being previously or currently recognized as human; and
- providing an option to replace the weak password with a different password that is not weak prior to granting access to the machine, based on the user being authenticated using the user authentication policy.

21. The method of claim 20, further comprising:
- monitoring a first number of verification code challenges issued responsive to requests to authenticate, the first number of verification code challenges having been issued to determine whether sources of the requests are human; and
- monitoring a second number of verification code challenges that have been solved by the sources of the requests that are human.

22. The method of claim 21, further comprising:
- measuring an impact on transaction flow based on monitoring a third number of user authentications occurring subsequent to the second number of verification code challenges and made by the sources of the requests that have been recognized as being human.

23. The method of claim 20, wherein the providing of the option to replace the weak password includes providing the option via at least one of:
- a subsequent electronic communication giving a recipient the option to initiate a password change by following an internet link to a web page hosted by the network system; and
- a web link to the web page at a time the weak password is detected.

24. A system for preventing an application from fraudulently obtaining a username and password in a network system comprising:
- a database including a plurality of tables;
- a network interface to receive a username and password, and a request from a device in the network system to access a machine;
- a weak password detection module to access at least a first of the plurality of tables to detect that the password is a weak password;
- a user/device detection module to access at least a second of the plurality of tables to determine whether a user of a device that submitted the password has previously been recognized as being human;
- a challenge module to initiate a test to determine whether the user of the device is currently recognized as being human, the challenge module to initiate the test responsive to the user/device detection module making a determination that the user has not previously been recognized as being human;
- an authentication module to enforce a user authentication policy upon the user responsive to at least one of the user/device detection module or the challenge module determining that the user has been previously or is currently recognized as being human; and
- an option module to provide an authenticated user an option to replace the weak password with a different password that is not weak prior to the authentication module granting access to the machine.

25. The system of claim 24, further comprising:
- a trend monitoring module to monitor a first number of tests issued responsive to requests to authenticate, the first number of tests having been issued to determine whether sources of the requests are recognized as being human, and to monitor a second number of tests that have been solved by the sources of the requests that have been recognized by the user/device detection module as being human.

26. The system of claim 25, wherein the trend monitoring module is to monitor a third number of user authentications made by the sources of the requests that have been recognized by the user/device detection module as being human, and to measure an impact on transaction flow based on the first, second and third numbers.

* * * * *

UNITED STATES PATENT AND TRADEMARK OFFICE
CERTIFICATE OF CORRECTION

PATENT NO. : 8,266,682 B2  
APPLICATION NO. : 12/103539  
DATED : September 11, 2012  
INVENTOR(S) : Mark C. Lee Page 1 of 1

It is certified that error appears in the above-identified patent and that said Letters Patent is hereby corrected as shown below:

ON THE TITLE PAGE:

Item (56) in column 2, under "Other Publications", line 8, before "Database", insert --"--, therefor Item (56) in column 2, under "Other Publications", line 9, after "Management,", insert --"--, therefor

IN THE SPECIFICATIONS:

In column 2, line 61, delete "(CAPTCHA)" and insert --(CAPTCHA))--, therefor

IN THE CLAIMS:

In column 15, line 32, in claim 7, delete "one:", and insert --one of:--, therefor Signed and Sealed this
Twenty-seventh Day of November, 2012

David J. Kappos
*Director of the United States Patent and Trademark Office*